US008949343B2

(12) United States Patent
Shen et al.

(10) Patent No.: US 8,949,343 B2
(45) Date of Patent: Feb. 3, 2015

(54) EMAIL CONFIRMATION PAGE FOR SOCIAL NETWORK NOTIFICATIONS

(75) Inventors: Jennifer Iting Shen, Santa Clara, CA (US); Omar H. Shahine, Menlo Park, CA (US); Steven D. Kafka, Mountain View, CA (US); Thomas Jan Stovicek, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/200,656

(22) Filed: Aug. 28, 2008

(65) Prior Publication Data
US 2010/0057859 A1 Mar. 4, 2010

(51) Int. Cl.
G06F 15/16 (2006.01)
H04L 12/58 (2006.01)
G06Q 10/10 (2012.01)
H04M 7/00 (2006.01)

(52) U.S. Cl.
CPC .............. *G06Q 10/107* (2013.01); *H04L 51/32* (2013.01); *H04M 2203/655* (2013.01); *H04L 12/588* (2013.01); *H04M 7/0024* (2013.01)
USPC ............................ 709/206; 715/753; 715/733

(58) Field of Classification Search
USPC ....................................................... 709/206
See application file for complete search history.

(56) References Cited

U.S. PATENT DOCUMENTS

| 6,266,703 | B1* | 7/2001 | Clark et al. .................... 709/237 |
|---|---|---|---|
| 6,832,245 | B1 | 12/2004 | Isaacs et al. |
| 6,931,419 | B1 | 8/2005 | Lindquist |
| 7,085,812 | B1* | 8/2006 | Sherwood ...................... 709/206 |
| 7,769,815 | B2* | 8/2010 | Wang et al. .................... 709/206 |
| 2004/0066404 | A1* | 4/2004 | Malik et al. .................... 345/752 |
| 2004/0122803 | A1 | 6/2004 | Dom et al. |
| 2004/0177118 | A1* | 9/2004 | Mason et al. .................. 709/206 |
| 2005/0021750 | A1* | 1/2005 | Abrams ........................ 709/225 |
| 2005/0120084 | A1* | 6/2005 | Hu et al. ........................ 709/206 |
| 2005/0159970 | A1* | 7/2005 | Buyukkokten et al. ........... 705/1 |
| 2005/0171799 | A1* | 8/2005 | Hull et al. ......................... 705/1 |
| 2006/0048059 | A1 | 3/2006 | Etkin |
| 2006/0095397 | A1 | 5/2006 | Torres et al. |

(Continued)

FOREIGN PATENT DOCUMENTS

| EP | 1591939 A2 | 2/2005 |
|---|---|---|
| WO | 2007076150 A2 | 7/2007 |
| WO | WO2008083388 A2 | 7/2008 |

OTHER PUBLICATIONS

Orkut Shows Updates from Your Friends, Google Operating System, Sep. 4, 2007, 2 pages, http://googlesystem.blogspot.com/2007/09/orkut-shows-updates-from-your-friends.html.

(Continued)

Primary Examiner — Hamza Algibhah
(74) Attorney, Agent, or Firm — Tom Wong; David Andrews; Micky Minhas

(57) ABSTRACT

A communication confirmation message provides social networking events in combination with information regarding addresses to a member. The message can be used to suggest additional social network friends to members of a social network. The communication confirmation message is utilized to provide additional information on the social network member's friends, information from third party social networks, and recommendations to add individuals or second parties with whom the social network member communicates as friends.

15 Claims, 8 Drawing Sheets

(56) References Cited

U.S. PATENT DOCUMENTS

| | | | |
|---|---|---|---|
| 2006/0139691 A1* | 6/2006 | Gopalasamy | 358/1.15 |
| 2006/0224675 A1* | 10/2006 | Fox et al. | 709/206 |
| 2006/0242581 A1 | 10/2006 | Manion et al. | |
| 2007/0038720 A1* | 2/2007 | Reding et al. | 709/217 |
| 2007/0106627 A1* | 5/2007 | Srivastava et al. | 706/20 |
| 2007/0106730 A1* | 5/2007 | Bhakta et al. | 709/206 |
| 2007/0106780 A1 | 5/2007 | Farnham et al. | |
| 2007/0143417 A1* | 6/2007 | Daigle | 709/206 |
| 2007/0162547 A1 | 7/2007 | Ross | |
| 2007/0174389 A1 | 7/2007 | Armstrong et al. | |
| 2007/0180078 A1 | 8/2007 | Murphy et al. | |
| 2007/0214141 A1* | 9/2007 | Sittig et al. | 707/7 |
| 2007/0223683 A1* | 9/2007 | Pearson | 379/355.01 |
| 2007/0233736 A1* | 10/2007 | Xiong et al. | 707/104.1 |
| 2007/0250566 A1* | 10/2007 | Appelman et al. | 709/204 |
| 2007/0266097 A1* | 11/2007 | Harik et al. | 709/204 |
| 2007/0288575 A1* | 12/2007 | Gillum et al. | 709/206 |
| 2008/0021870 A1* | 1/2008 | Birnbaum et al. | 707/3 |
| 2008/0065668 A1 | 3/2008 | Spence et al. | |
| 2008/0134040 A1* | 6/2008 | Pennington et al. | 715/733 |
| 2008/0168033 A1* | 7/2008 | Ott et al. | 707/3 |
| 2008/0201447 A1* | 8/2008 | Kim | 709/218 |
| 2008/0221730 A1* | 9/2008 | Sakata et al. | 700/245 |
| 2008/0228887 A1* | 9/2008 | Robertson et al. | 709/206 |
| 2008/0235353 A1* | 9/2008 | Cheever et al. | 709/219 |
| 2008/0250332 A1* | 10/2008 | Farrell et al. | 715/753 |
| 2008/0281925 A1* | 11/2008 | Kwak | 709/206 |
| 2008/0294607 A1* | 11/2008 | Partovi et al. | 707/3 |
| 2008/0320417 A1* | 12/2008 | Begley et al. | 715/822 |
| 2009/0049130 A1* | 2/2009 | Plooij et al. | 709/206 |
| 2009/0070684 A1* | 3/2009 | Aldrich et al. | 715/743 |
| 2009/0132933 A1* | 5/2009 | Faski | 715/753 |
| 2009/0164574 A1* | 6/2009 | Hoffman | 709/204 |
| 2009/0172783 A1* | 7/2009 | Eberstadt | 726/4 |
| 2009/0177744 A1* | 7/2009 | Marlow et al. | 709/204 |
| 2009/0197681 A1* | 8/2009 | Krishnamoorthy et al. | 463/42 |
| 2009/0234922 A1* | 9/2009 | Appelman | 709/206 |
| 2009/0239467 A1* | 9/2009 | Gulin et al. | 455/41.2 |
| 2009/0282144 A1* | 11/2009 | Sherrets et al. | 709/224 |
| 2009/0300139 A1* | 12/2009 | Shoemaker et al. | 709/217 |
| 2009/0307610 A1* | 12/2009 | Ryan | 715/756 |
| 2009/0319288 A1* | 12/2009 | Slaney et al. | 705/1 |
| 2009/0327437 A1* | 12/2009 | Estrada | 709/206 |
| 2010/0030788 A1* | 2/2010 | Chen et al. | 707/10 |
| 2010/0180211 A1* | 7/2010 | Boyd | 715/751 |

OTHER PUBLICATIONS

Vanessa Van Petten, What are Kids Doing on Facebook, MySpace and Other Social Networking Sites?, 8 pages, http://www.vanes-savanpetten.com/2008/02/13/what-are-kids-doing-on-facebook-myspace-and-other-social-networking-sites/.

Nicholas Einstein, Xobni and the Future of the Email Inbox, Jun. 5, 2008, http://blog.emailexperience.org/.

Yahoo! to Reinvent Mobile Communications with Yahoo! oneConnect(TM), Feb. 12, 2008, COMTEX, http://files.shareholder.com/downloads/YHOO/237942776x0x169085/50f7ee62-2aa1-4ca5-bb88-308829e68323/YHOO_News_2008_2_12_General.pdf.

Notification of International Preliminary Report on Patentability and the Written Opinion of the International Searching Authority dated Feb. 11, 2010 in PCT Application No. PCT/US2009/051781.

Extended European Search Report dated Dec. 9, 2011, European Application No. 09810420.1 filed Jul. 26, 2009, 5 pages.

Response to Office Action dated Sep. 4, 2012, Chinese Patent Application No. 2009801341759, 12 pages.

Chinese Office Action dated May 3, 2012, Chinese Patent Application No. 200980134175.9, filed Jul. 26, 2009, 9 pages.

Response to Office Action filed Mar. 29, 2013 in Chinese Patent Application No. 200980134175.9, 21 pages.

Response to Office Action filed May 7, 2013 in European Patent Application No. 09810420.1, 10 pages.

Office Action dated Jul. 3, 2013 in Chinese Patent Application No. 200980134175.9, 10 pages.

Response to Office Action filed Sep. 5, 2013 in Chinese Patent Application No. 200980134175.9, 22 pages.

Summons to attend Oral Proceedings and Communication dated Nov. 5, 2013 in European Patent Application No. 09810420.1, 7 pages.

Summons to attend Oral Proceedings and Communication dated Nov. 28, 2013 in European Patent Application No. 09810420.1, 6 pages.

Chinese Office Action dated Jan. 30, 2013, Chinese Patent Application No. 200980134175.9, filed Jul. 26, 2009, 11 pages.

Office Action dated Jan. 8, 2013, European Patent Application No. 09810420.1, 7 pages.

Response to Summons Proceedings dated Apr. 4, 2014, in European Patent Application No. 09810420.1, with Replacement Claims, 9 pages.

Office Action dated Apr. 2, 2014 in Chinese Patent Application No. 200980134175.9 with English Summary of the text, 10 pages.

Office Action dated May 20, 2014, in European Patent Application No. 09810420.1, with the minutes, 16 pages.

English Translation of Amended Claims filed in Response to Office Action dated Sep. 16, 2014, 7 pages.

Office Action dated Jun. 25, 2014 in Taiwanese Patent Application No. 098125726, with English translation of Search Report, 11 pages.

* cited by examiner ing a social network in accordance with the present technol-
EMAIL CONFIRMATION PAGE FOR SOCIAL NETWORK NOTIFICATIONS

BACKGROUND

Electronic social networking communication is a popular way for individuals to communicate with one another. Social net grouping web sites allow users to connect for various reasons such as romantic involvement, friendship, professional connections, and common interests. Electronic social networking systems are dependent upon users connecting to and identifying other individuals within the social network as "friends," those individual with whom they are willing to share greater access to personal information than non-friends.

Most social networking systems include mechanisms to increase a member's friends in the network. These systems may, for example, identify "friends of friends," or users which are connected to one's own friends within the social network. The more friends one has within the social network, the more powerful the social network becomes.

Generally, some small portion of the user interface of the social network includes an indicator of the network friend suggestions.

SUMMARY

A communication confirmation message is used to provide social networking events in combination with information regarding addresses to a member, and suggest additional social network friends to members of a social network. A communication confirmation message is utilized to provide additional information on the social network member's friends, information from third party social networks, and recommendations to add individuals or second parties with whom the social network member communicates as friends.

In one embodiment, the technology includes receiving input to send an email communication from the member, determining one or more addressees in the email communication and determining the relationship of the addressees to the member. Once the relationship is determined, a sent mail confirmation interface is displayed which includes status event information regarding the one or more addressees in combination with social networking events for friends of the member.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Technology is presented for using a sent email confirmation page to suggest additional social network friends to members of a social network. A sent mail confirmation screen indicates that a composed message was in fact sent to the destination address or addresses and generally indicates the addressees to whom the information was forwarded. In accordance with the present technology, the sent mail confirmation screen is utilized to provide social networking events in combination with information regarding addresses to a member. This information can include, without limitation, information on the social network member's friends, information from third party social networks, and recommendations to add individuals or second parties with whom the social network member communicates. Communication is performed using communications services provided by a service provider who also maintains the social network. While the technology will be described in the context of an email confirmation page, it will be understood that the technology may be utilized in other forms of communication ending events. For example, a message may be automatically generated and forwarded to a member at the end of an IM conversation with another user.

Figure 1:
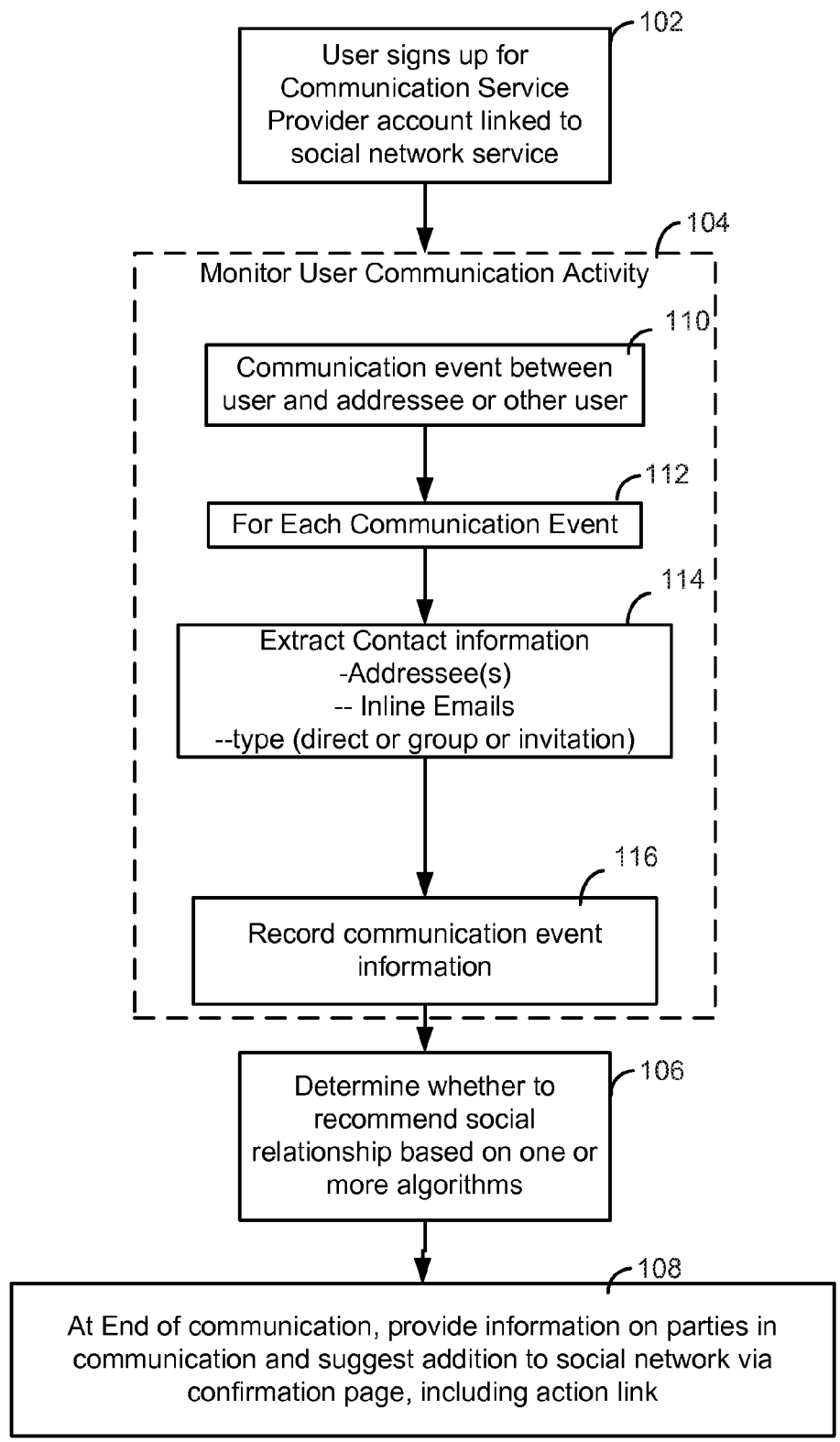
FIG. 1 is a method for identifying additional friends within a social network.

FIG. 1 illustrates an exemplary method in accordance with the present technology. At step 102, an individual signs up with a communication service provider account linked to a social network service. One example of such a service is Windows Live, with a social networking component known as Windows Live Spaces and a web-based email service, known as Windows Live Hotmail. The social networking service allows participants to identify other individuals as friends with whom information can be shared. In a social networking service, the member is generally notified of events which occur based on the activity of "friends" within the service. For example, if a friend posts a blog entry, this posting activity will be noted within the service and an event notification sent to friends. If a friend posts photographs to a sharing web site, this activity can also be shared. Various types of social networking activities include photo sharing, web log authoring, social bookmarking, providing status updates, sending group invitations, participating in group discussions, and other types of activities.

Optionally, at step 104, a members' communication activity is monitored. In one aspect, the monitoring is used to determine information to present to a user at the end of the communication event. In one embodiment, the event is an email message, and the end of the communication event is a sent email confirmation page. At step 104, email activity can also be monitored to aid in determining whether to suggest another party as a friend. A service provider offering both a social networking service and communication services has the ability to leverage the communication services for the benefit of the social networking service.

At step 106, one or more algorithms may be used to determine whether other parties in the communication should be recommended to the user as a friend. Such algorithms may include identifying friends of friends or using the activity monitoring resulting from step 104. At the end of the communication, at step 108, a message is displayed to the user with the friend suggestions, friend social network news, or other messages concerning the parties in the communication with the member. One advantage of using the activity monitoring of step 104, the service provider can determine whether to recommend a social relationship based on communication activities. In one example, email communication by social network participants can be monitored and used to suggest friend relationships based on frequency and type of activity. If the system determines that the activity merits recommendation as a friend, then the system can recommend friends based on communication activity at step 108.

As discussed below, in the sent mail confirmation interface, a multitude of information can be provided regarding friends and non-friends of the social network member. Because the service provider provides both the social network service and the communications service, activities of the member in both services can be leveraged off each other.

The step of monitoring communication activity 104 may be comprised of a series of sub steps, as illustrated in FIG. 1. In FIG. 1, step 104 is broken down into the steps of monitoring a communication event 110 between a member and an addressee or another user, and, for each communication event so monitored at step 112, extracting contact information from the event at step 114 and recording communication event information at step 116. The communication event at step 112 may generally comprise an e-mail communication between a social network member and another user, or it can comprise another communication event such as an instant message, or social network sharing event. At step 114, contact information may be extracted from the communication event. In an e-mail message, this may include retrieving the addressee information, or other information in the "To:", "cc:", or "bcc:" fields. This may also include extracting content information from information within the text or message field of an e-mail message, and may include determining the type of communication between the individuals. At step 106, a determination may be made as to whether or not to recommend a social relationship based on the communication activity between members. At step 108, at the end of an event, a suggestion to add a social member may be provided within a social network information feed in a sent mail confirmation screen.

Figure 2:
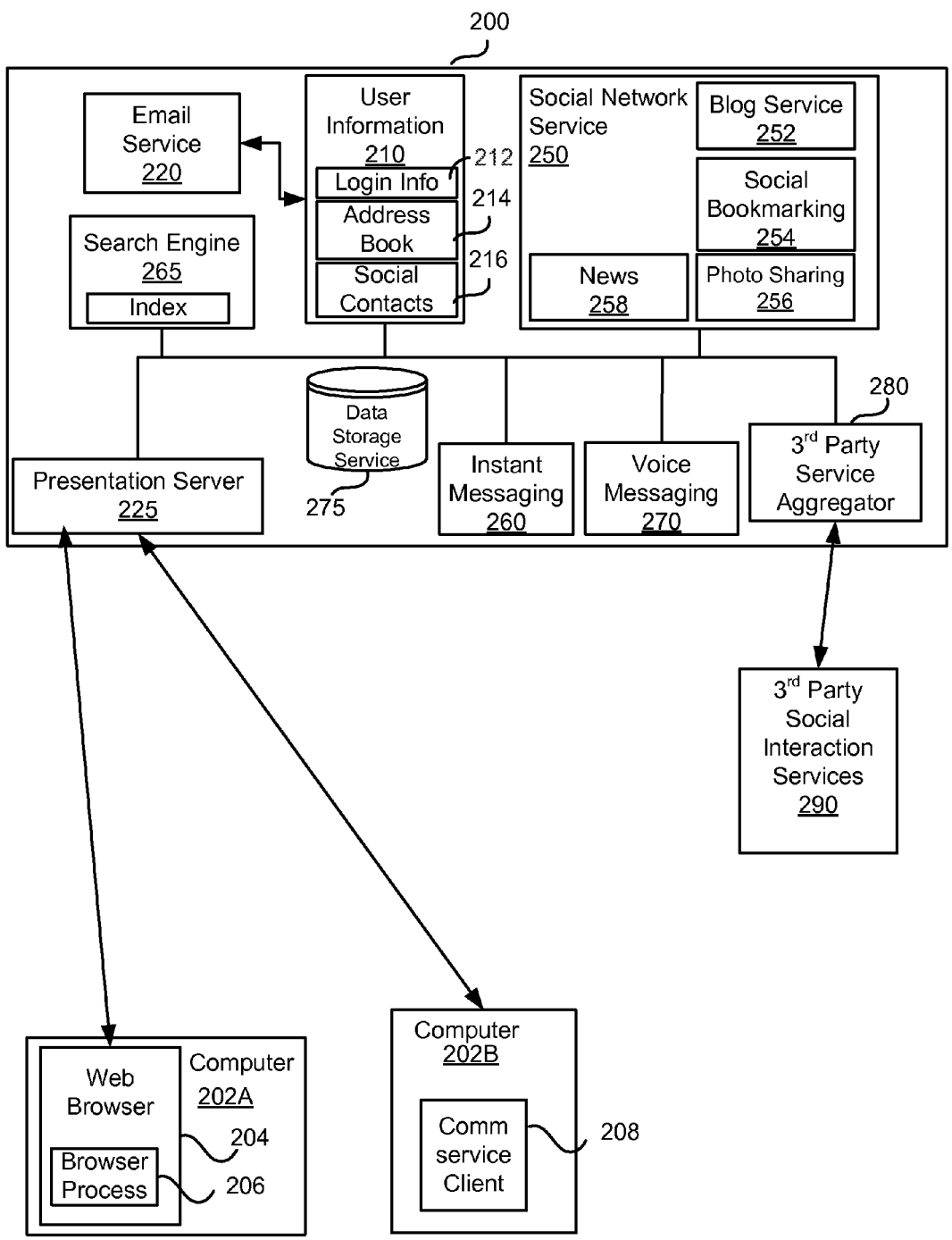
FIG. 2 is a block diagram illustrating a system for providing a social network in accordance with the present technology.

FIG. 2 illustrates an exemplary web service system 200 for implementing the technology presented herein. A web service 200 may include a number of different communication services including, for example, an e-mail service 220, an instant messaging service 260, a voice communication service 270, and a social networking service 250. In order to utilize the communication services provided by the web service provider 200, users create user accounts with a user information service 210. The user information service records log-in information 212 for the user, and creates a data store associated with the user in a data storage service 275. The user information service will maintain the log-in information 212, and associate it with the user, address book 214, and a social contact book 216. The address book 214 can maintain contact information for individuals with whom the user wishes to communicate with, but for whom the user does not generally identify as a "friend". The social contact service 216 maintains a list of the user's "friends" with whom the user communicates using other services provided by the social networking service 250. A separate "buddy list" (not shown) is maintained for services with whom the user interacts via the instant messaging service 260. The voice messaging service 270 can use contact information from the buddy list, the address list, or the social contacts to provide voice communications between members and others. A search engine service which indexes some or all of the user content within the service 200 may also be provided.

The social networking service 250 provided by the web service 200 may include a web blogging service 252, a social bookmarking service 254, a photo sharing service 256, and a news service 258. The blog service 252 allows users to write personal and social commentary which may be presented to both friends, and the public at large. A social bookmarking service 254 allows users to share an interesting web link that the user thinks friends might find interesting. A photo sharing service 256 allows users to share both public and private photos which have been uploaded to the data store 275 with friends and with public. A news service 258 allows users to post status messages which inform their friends of their current activities and planned activities. Users interact with the web service 200 via computers 202A or 202B. Computers 202A and 202B communicate with, for example, a presentation server 225. The presentation server 225 may, in one embodiment, comprise a web server which provides one or more pages and/or web-based applications to a web browser 204 executing a browser process on computer 202A. Alternatively, a dedicated communication service client 208 (such as in instant messaging or VOIP client) may operate on a computer (202b) and communicate with the presentation server, or with one of the services provided by the web service 200 directly. Communication with the presentation server 225 may occur via one or more public and private networks, such as the Internet.

Also shown as a component of web service 200 is a third-party social network service aggregator 280. A third-party service social network service aggregator 280 incorporates information provided by third party social network services 290. Many social networking services provide application programming interfaces (APIs) which allow data to be extracted from the social networking service, or themselves provide information streams, such as, for example, RSS feeds, which allow information to be published from the service and incorporated into other presentation or social networking services. The third-party service aggregator 280 can extract information from third-party networking services or receive the information feed which may then be presented to the user via the presentation service through the social networking service 250. This information can also be used by the service provider 200 to in conjunction with friend recommendations as discussed herein.

Figure 3A:
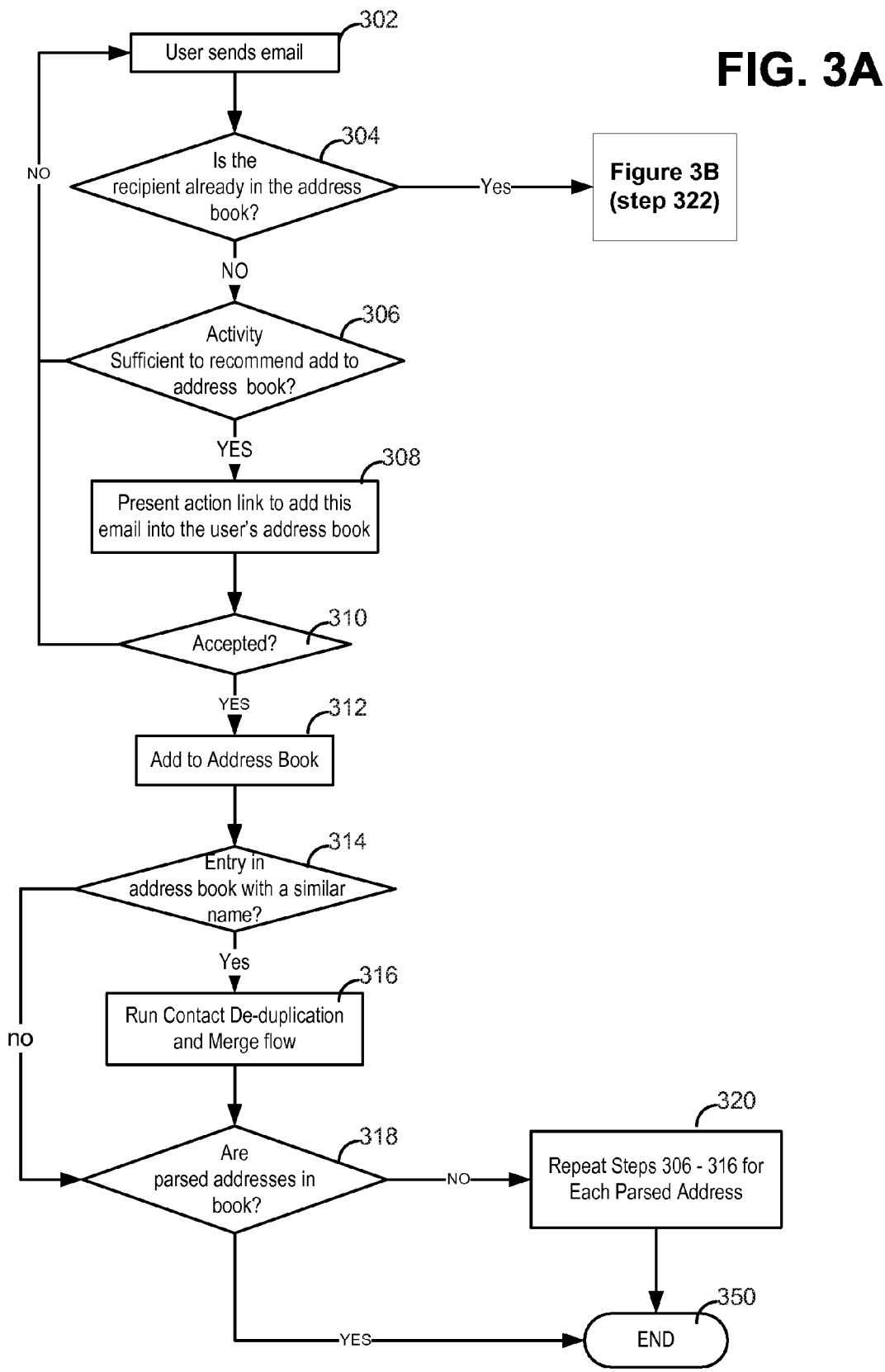
FIG. 3A and 3B are a flowchart illustrating an embodiment of a method for monitoring communication events to identify potential friends within a social networking service.
Figure 3B:
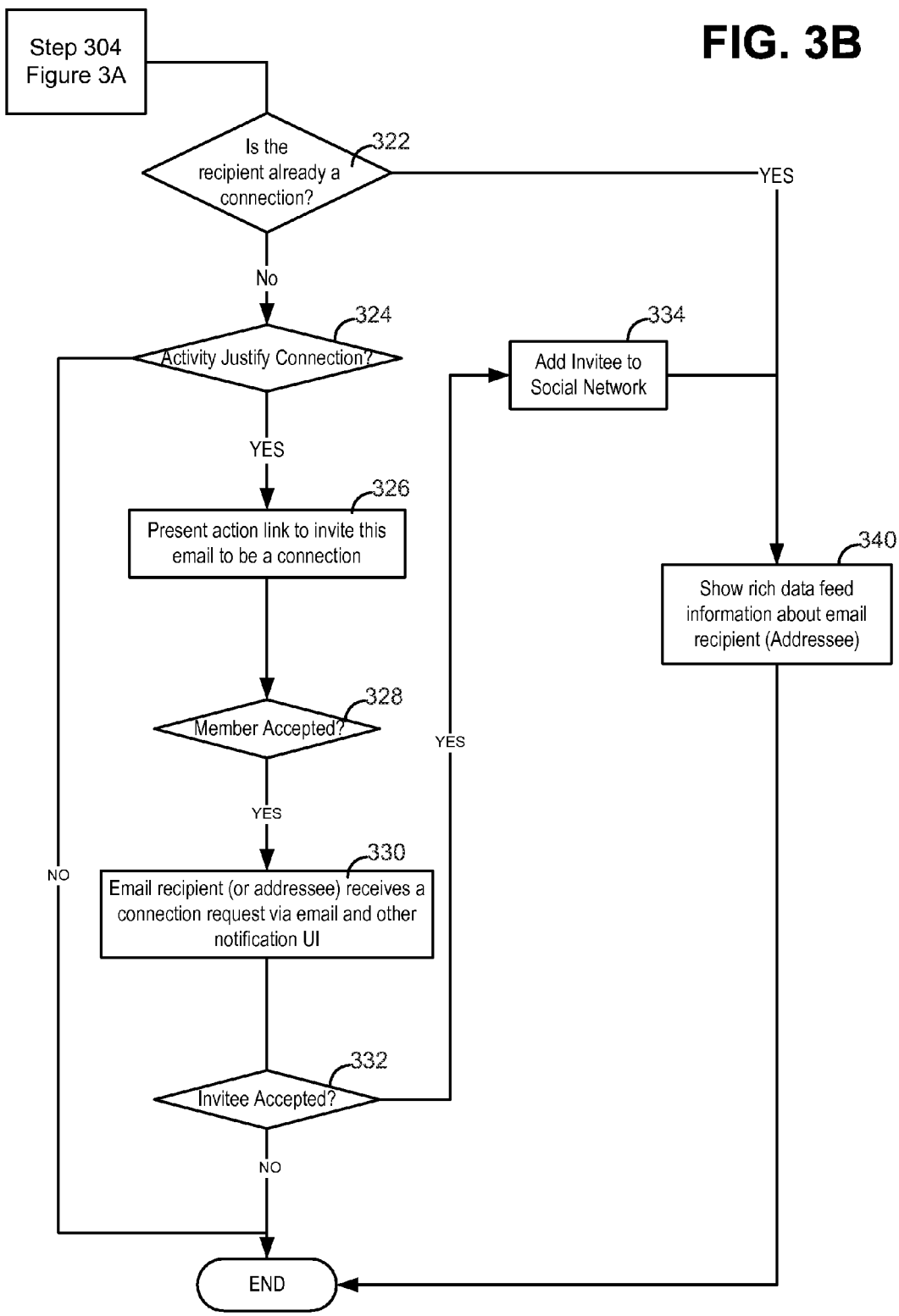

FIGS. 3A and 3B illustrate a method for providing information and action links on a confirmation page in accordance with the present technology. While the technology will be described in the context of email activity, other forms of communication events may be used.

At step 302, a social network member will forward an e-mail to one or more addressees or second parties. The e-mail may include, for example, other e-mail addresses, a message, and activity such as sharing photos, sharing links, or sharing web logs. The act of communication itself, and the sharing activity, may be indicative of activities which occur between social network member "friends". Once the member forwards an e-mail at step 302, a determination is made at step 304 as to whether or not the recipient is already in the member's address book at step 304. If the address is not in the member's address book at step 304, then a determination is made at step 306 as to whether or not the communication activity is sufficient to merit recommending the addressee for addition to the member's address book. The activity required for recommendation may be as minimal as sending of a single e-mail, or may require additional communication activity, such as the sending of several e-mails combined with other social network sharing activities which are extracted from the content of the message. At step 306, if the activity is sufficient to recommend adding the recipient or recipients to a member's address book, then a notification will be provided on a send mail confirmation page at step 308. The notification may include an action link to add the e-mail to the user's address book. If the add link is accepted at step 310, then the recipient will be added to the address book at step 312.

If the add link is not accepted at step 310, or if the activity is insufficient to recommend the recipient for addition to the user's address book, then the method will return to step 302 waiting for the next e-mail from the member. If an entry is added to the address book, a duplicate determination routine will occur. At step 314, a determination will be made as to whether or not an entry exists in the user's address book with a similar name or address to the user just added. If a similar entry exists, then at step 316, a contact de-duplication routine will be run to determine whether or not two entries are similar enough to merit combining the entries into a single address book entry. At step 318, the method will examine other addresses which are contained in the e-mail address in, for example, the message field, to determine whether these addresses parsed from the message are in the member's address book. If the messages are not in the address book, then at 320, steps 306, 308, 310, 312, 314 and 316 will be repeated for each address within the address book.

Returning to step 304, if the recipient of the e-mail is already in the member's address book, then at step 322 (FIG. 3B) a determination will be made as to whether or not the recipient is already a social network "friend". If the recipient is not a social network friend, then a determination will be made at step 324 as to whether or not the communication activity or some other friend recommendation algorithm merits the recommendation of the addressee as a social network friend. Examples of determining how such communication activity can be derived in co-pending U.S. patent application Ser. No. 12/200,585 entitled "LEVERAGING COMMUNICATIONS TO IDENTIFY SOCIAL NETWORK FRIENDS", having inventors Jennifer Iting Shen, Omar H. Shahine, Steven D. Kafka, Jennie Park Telehowski, Eliot Gillum, Sara Liu Yang, filed on Aug. 28, 2008 and assigned to the assignee of the present application and hereby specifically incorporated by reference in its entirety.

If the communication activity is sufficient to justify recommending the addressee as a social network connection at step 324, then at step 326, an action link and message will be presented to the member on the send mail confirmation page. The action link will include a link which will generate an invitation to the addressee of the message, or addressees parsed from the message, inviting them to join the social network provided by the service provider. If the member accepts the invitation to invite the addressee or second party at step 328, then the e-mail recipient or addressee will receive a connection request via e-mail (or other communication means) at step 330. If the invitee accepts the invitation request at step 332, the invitee will be added to the social network at step 334 of the social network member.

If the recipient is already a network connection, at step 322, then at step 340, the send mail confirmation page will display a rich data feed of information regarding the e-mail recipient or the addressee. As discussed below, the rich data feed may include all the social network activity of the friends of the member, as well as events focused on the party or parties with whom recent communication activity has occurred. Various types of social networking activities include photo sharing, web log authoring, social bookmarking, providing status updates, sending group invitations, participating in group discussions, and other types of activities.

Figure 4:
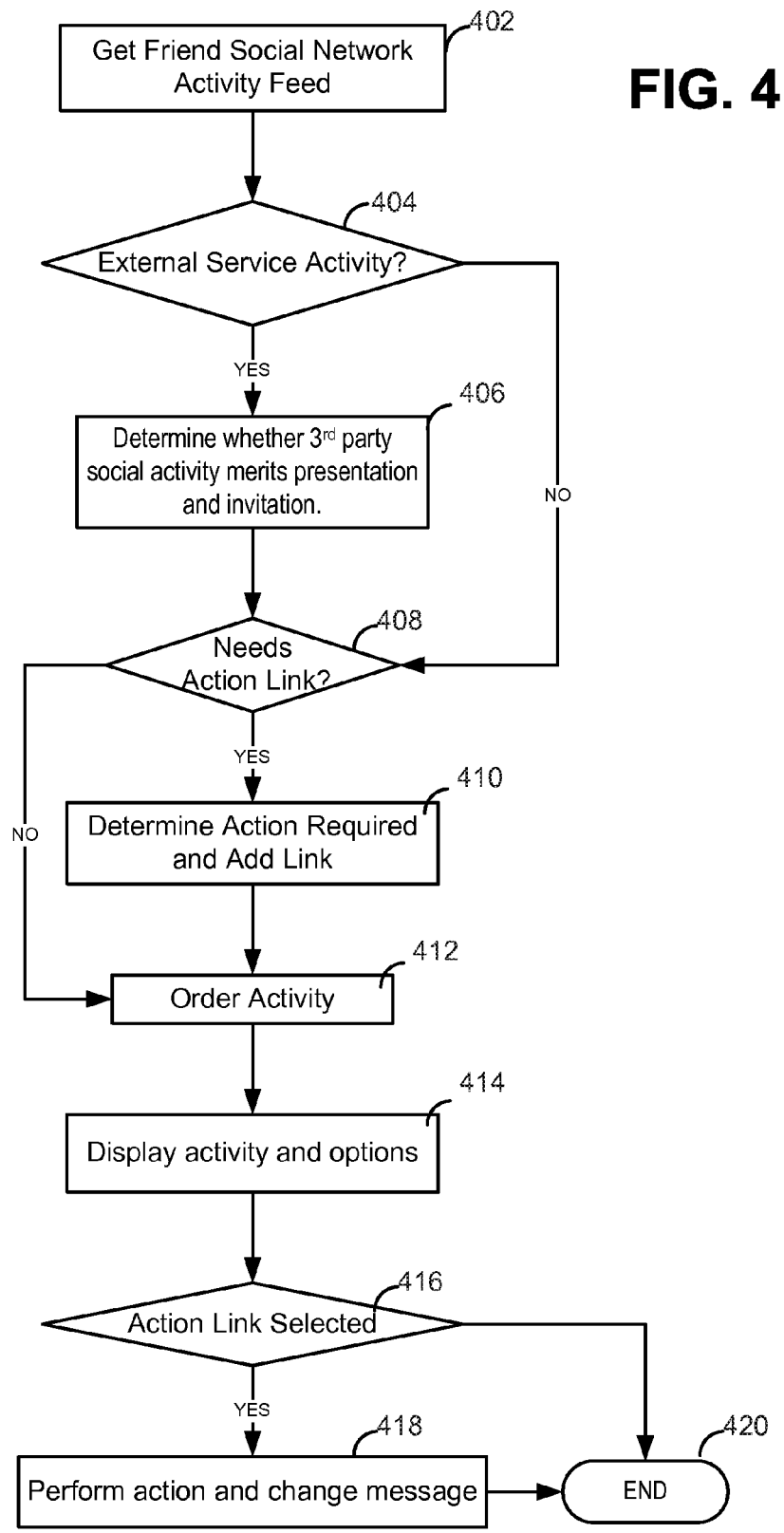
FIG. 4 illustrates a method for determining whether to recommend an individual for friend status based on communications with the individual.

FIG. 4 illustrates the method for displaying a social network feed on a send mail confirmation page described above at step 340. At step 402, a friend's social activity feed from the social network provided by the social network provider will be retrieved at step 402. At step 404, a determination will be made as to whether external social network activity should be added. External activity is provided by third party networks and culled using the third party service aggregator, discussed above. If such activity is available at step 404, then at step 406, a determination will be made as to whether such information should be included in the confirmation page. Various factors determine whether to add such information. For example, a service provider may wish to focus the user on activity within their own social network, or may decide that the focus of information on the confirmation page should be based on a certain theme—such as a business related theme or activity related theme.

At step 408, a determination is made as to whether or not each activity item in the feed (both the internal and external event feed, if used) merits an action link. The action link is presented on the confirmation page to enable a member action associated with the link. For example, if the activity is indicative that the friend has posted a blog entry, an action link may allow the member to navigate to the blog via the action link.

Figure 5:
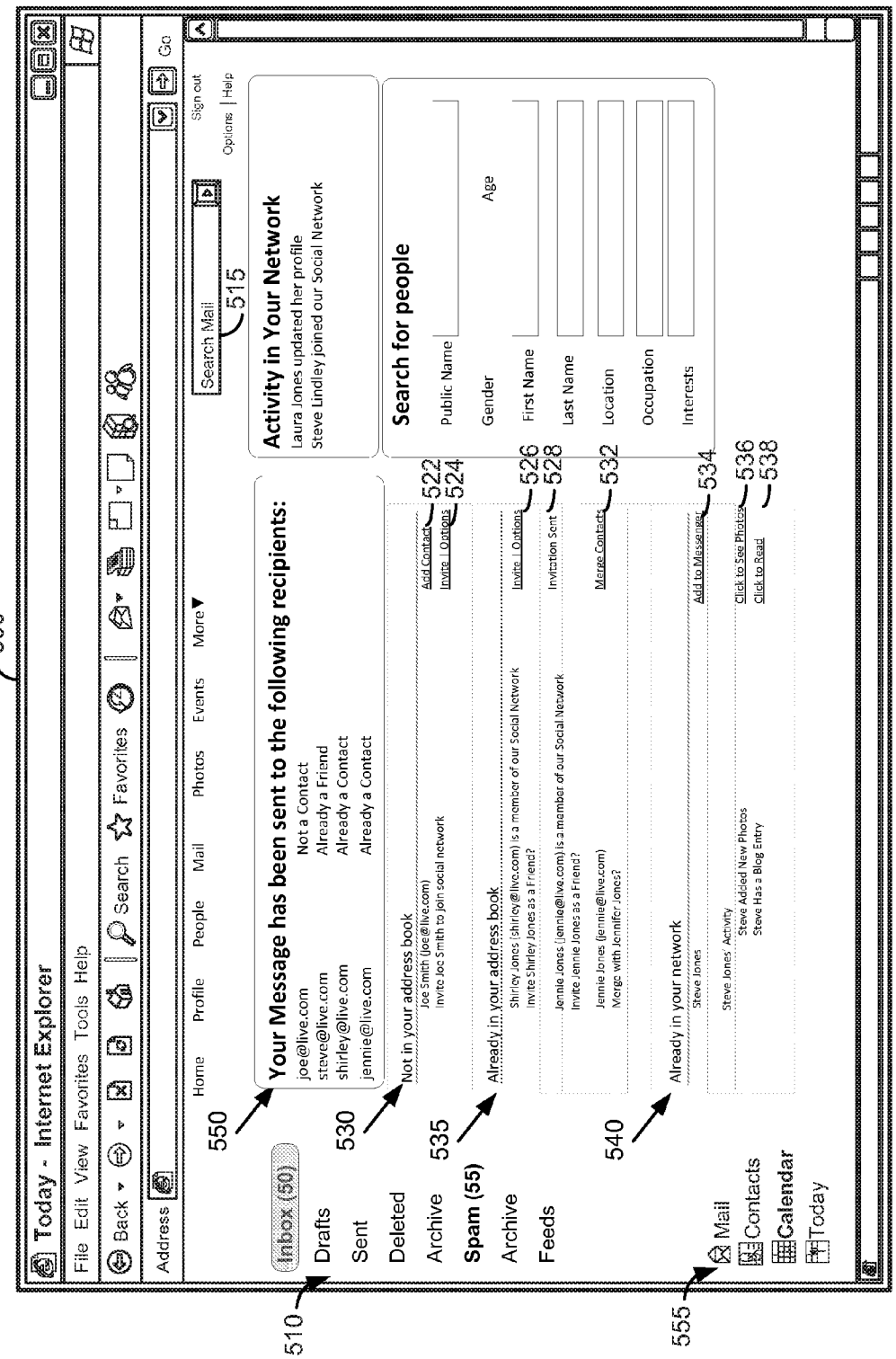
FIG. 5 is an exemplary unit or interface for presenting a recommendation to a user.
Figure 6:
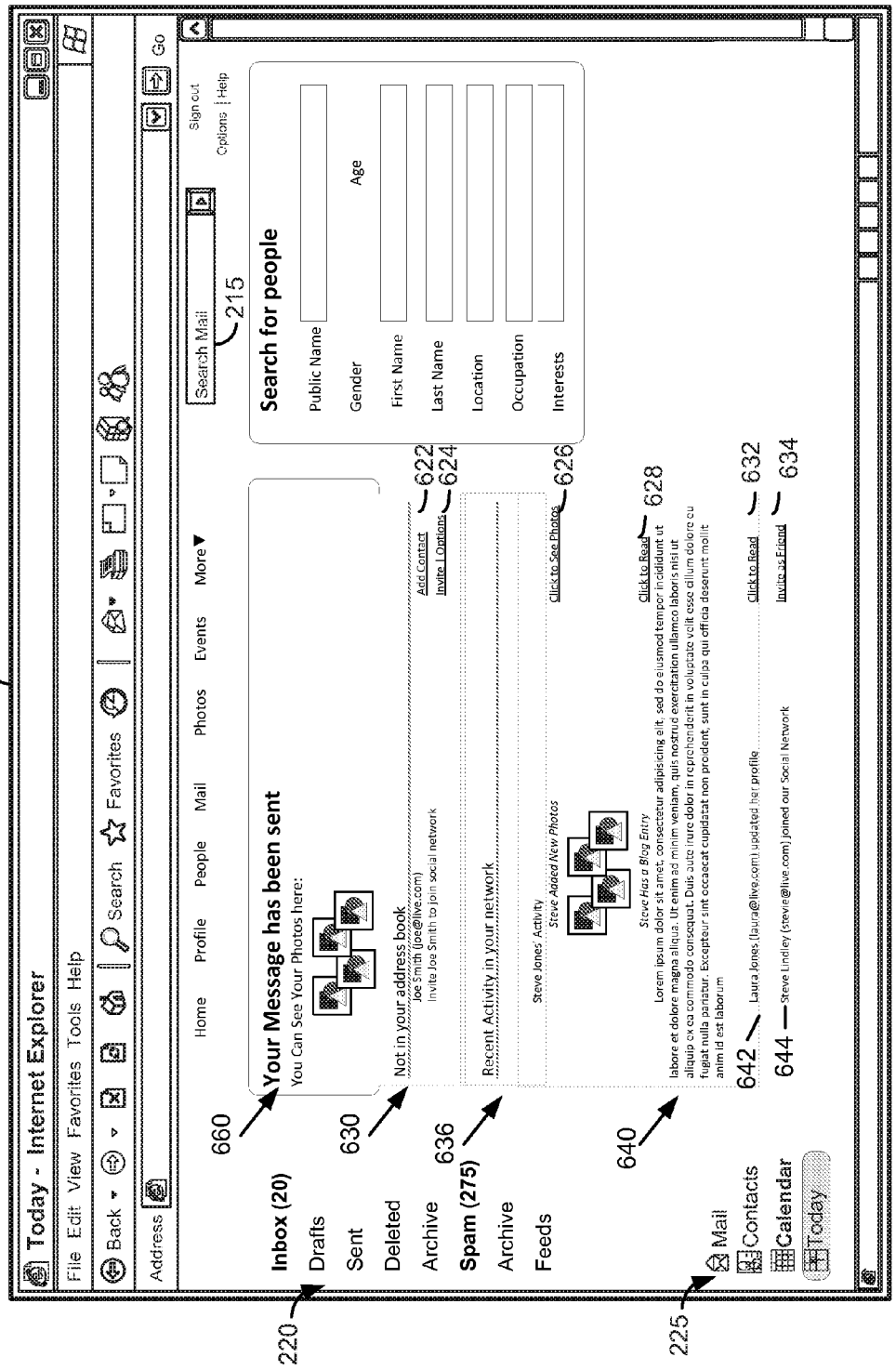
FIG. 6 is a second exemplary interface for presenting a recommendation for a user.

If an action link is needed, then at step 410, the type of action associate with the link is determined and the action link created. At step 412, Activity in the feed along with associated action links is ordered. The order may be selected for display in any number of various formats. For example, one may chose to order friend activities first, and non-friend activities, or suggestions to add friends, second. Conversely, one may choose to add suggestions to add friends first and activity of social network members and friends second. This is illustrated at FIGS. 5 and 6, respectively. Once the ordering is complete at step 412, then the activity and link options are displayed at step 414. Examples of this display are shown at FIGS. 5 and 6.

If a user selects an action link at step 416, then the action is performed and a message associated with the link is displayed at step 418. As illustrated below, messages are associated with each event and displayed on the confirmation page. Prompt or status messages are also associated with the action link. Each prompt or status message may change in-line in the confirmation page without re-generating the page to indicate selection of the action link.

FIG. 5 illustrates a first user interface for presenting the recommendations determined in accordance with the present technology to a user. FIG. 5 illustrates a browser window 500 which may be presented by the presentation server 225. The browser window displays a sent mail confirmation page 510 for the email communication service. The user interface includes a mail interface 510 which has a selection menu 515 allowing the user to select between one of a number of folders including inbox, drafts, sent mail, deleted mail, archive, spam, and feeds. A second navigation menu 555 allows the user to select between various services provided by the social network provider The confirmation page includes a notification message 550 displaying the message drafted and sent by the member has been forwarded to, in this example, four users: joe@live.com, steve@live.com, shirley@live.com and jennie@live.com. The status message 550 also indicates the contact status of each member, including whether the addressee is in the members address book and identified as a contact, not in the address book, or whether the addressee is already a friend. An information stream 530, 535, 540 provides the user with notifications of activity which have occurred in the network. In this example, the activity stream is organized by the address book status of the users in the message, then by other activity in the network. The activity stream 530, 535, 540 may also provide recommendations to the user. For example, at 530, the system is determined that the member has e-mailed Joe Smith (joe@live.com), with sufficient activity to justify recommending Joe Smith as an addition to the members contact book as well as adding Joe Smith as friend. Two action links 522, 524 are provided. Link 522 would add the user to the address book of the member, while link 524 will add the user as a friend (and to the member's address book).

As illustrated at 550, Shirley and Jane are already indicated as being contacts in the user's address book. At 535, an indication of the users already in the member's address book is provided. User Shirley Jones, while in the user's address book, is not currently a friend of the user. Hence, the message "Shirley Jones is a member of the social network" is shown, along with an invite action link 526 and message, "invite Shirley Jones as a friend."

Message set 535 also illustrates a change in the message displayed after an action link is selected. In the example at 540, Jenny Jones (Jenny@live.com) is a member of the social network, but the action notification 5528 indicates that the invitation has already been sent. This is an example of a message where the member has already clicked the action link, and the display has changed to show the member that the invitation has been sent to Jenny to become a social network friend.

The second message concerning Jennie Jones illustrates an example of a message which may result from de-duplication 316. At 532, the message "merge with Jennifer Jones" and the action link "merge contacts" are shown. This results from the determination that there is more than one contact with the name Jennifer Jones, or a similar e-mail address, in the user's address book.

Finally, as indicated at 540, a news feed of users already in the network is provided. User Steve Jones is indicated already to be a friend, but may not be in the user's buddy list for the messenger service provided by the web service provider. Hence a "add to messenger" action link is provided at 534. Likewise, Steve Jones' activity of adding new photos and blog entries are listed as messages, along with action links 536, 538 allowing the user to "click to see photos" or "click to read" the blog are provided.

FIG. 6 illustrates a second example of a user interface 500. The interface has similar components to the interface shown in FIG. 5 except that in this example, the user has shared photos with another individual in the message and the notification 660 indicates the sharing activity within the message. Similarly, the ordering of activity in the send mail confirmation page begins with individuals not in the user's address book, but is followed by a listing of recent activity in the network. In this case, the recent activity includes adding photos by Steve Jones at 636, a summary of the blog entry by Steve Jones at 640, an update of the profile by another user, Laura Jones at 642, an indication that a user in the user's address book has joined the social network at 644.

Action links 622 and 624 allow the member to add or invite user Joe Smith, respectively. Link 626 allows the member to navigate to the photos shared by Steve Jones. Link 628 allows the member to navigate to the blog entry authored by Steve Jones. Link 632 navigates the member to the profile of Laura Jones. Link 634 allows the member to quickly "friend" a member of the member's address book—Steve Lindley—who has recently joined the social network.

The examples presented in FIGS. 5 and 6 are illustrative only. Other messages and action links may be presented. Any event in a social network may be presented in the feed in the sent mail confirmation page. While the ordering is illustrated as beginning with users not in the member's address book, the ordering of events in the feed may take any form.

In a further example, the feed may be used to issue reminders regarding friends. For example, if a friend has an upcoming birthday, the feed in the sent mail confirmation page may present a reminder and an action link to a purchasing service allowing the member to send a gift to the friend. The feed information regarding reminders may be prioritized by users with whom a communication has just been sent or by other friends in the network.

Figure 7:
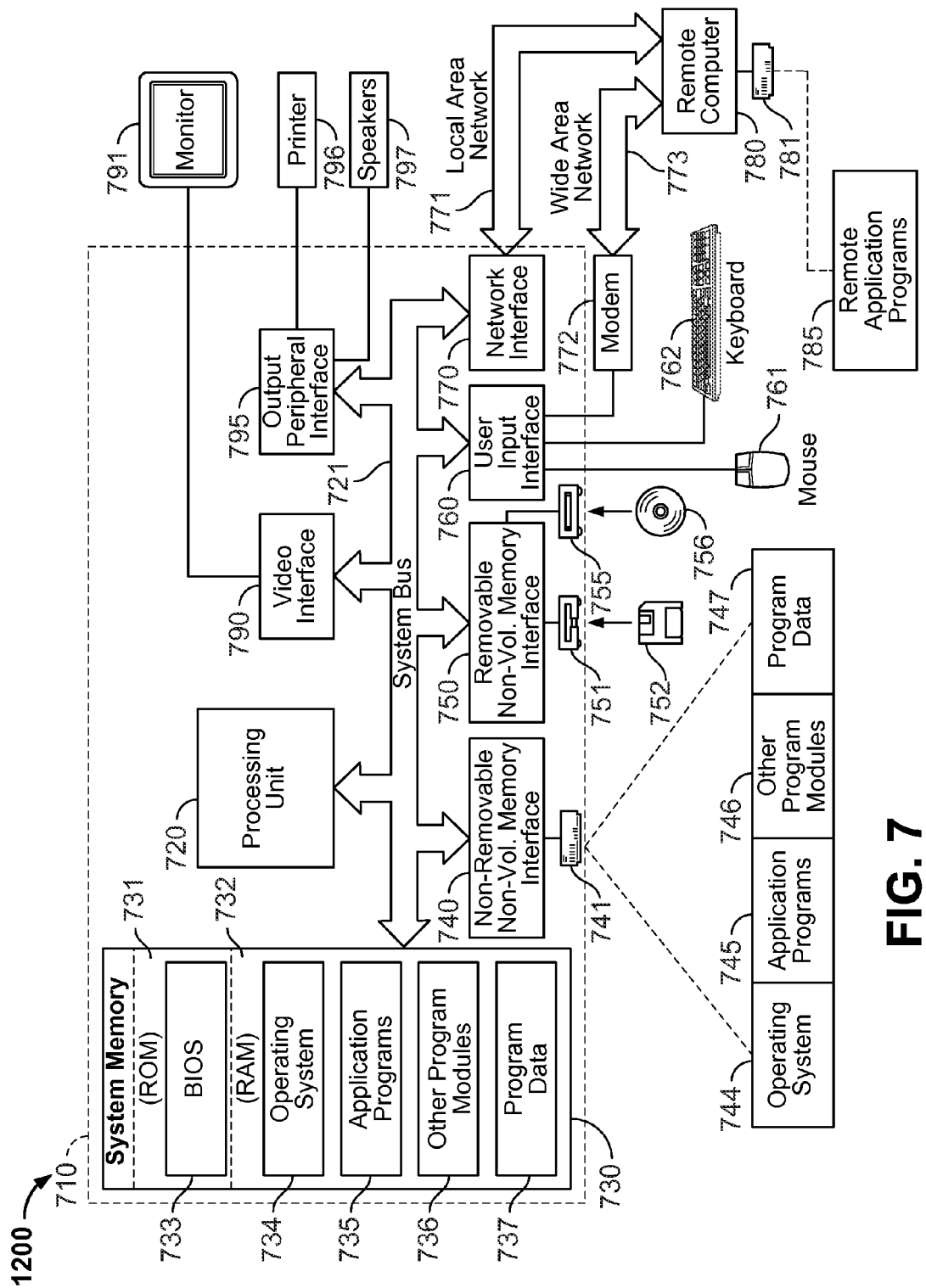
FIG. 7 is a processing system suitable for implementing any of the processing systems identified above with respect to FIG. 2.

FIG. 7 illustrates an example of a suitable computing system environment 1200 such as personal computer.

With reference to FIG. 7, an exemplary system for implementing the technology includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 740 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 20 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 790.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

The technology is operational with numerous other general purpose or special purpose computing system environments or configurations. Examples of well known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The foregoing detailed description of the system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that

What is claimed is:

1. A method for displaying social network information to a member of a social networking service in a confirmation interface of an e-mail service communicatively linked to the social networking service, comprising:
   receiving by the e-mail service executing on one or more processors input to send an e-mail communication from the member to one or more addressees;
   determining a social networking friend relationship status of the one or more addressees to the member by the e-mail service based on user information data accessible via the linked social networking service; and
   responsive to completion of sending the e-mail, the e-mail service retrieving from the linked social networking service any social networking events associated with any of the one or more addressees accessible to the member based on the determined social networking friend relationship status, and displaying by the email service a sent mail confirmation interface confirming that the e-mail was sent to the one or more addressees, the sent mail confirmation interface including the social networking friend relationship status regarding the one or more addressees in combination with one or more social networking events for any of the one or more addressees determined to have friend status with the member in the linked social networking service and for a social networking friend of the member other than the one or more addressees.

2. The method of claim 1 wherein the step of displaying by the e-mail service includes ordering social networking friend relationship status information and the one or more social networking events based upon social networking service friend relationship status to the member.

3. The method of claim 1 wherein the method further includes the e-mail service determining and associating an action link of a navigation link based on data accessible via the communicatively linked social networking service for each social networking event displayed.

4. The method of claim 3 wherein the method further comprises the e-mail service determining and associating an action link providing an invitation to the one or more addressees determined as lacking social networking friend relationship status to join the social networking service as one or more friends of the member.

5. The method of claim 1 wherein the e-mail service retrieving from the linked social networking service any social networking events associated with any of the one or more addressees accessible to the member based on the determined social networking friend relationship status further comprises retrieving the one or more social networking events from a plurality of social networking services in which the member and the one or more addressees are related as social networking friends.

6. The method of claim 1 wherein the one or more social networking events are prioritized so that events concerning the one or more addressees who are social networking friends of the member are shown before other social networking events.

7. One or more computer readable non-volatile storage media having encoded thereon instructions for causing one or more processors to perform a method for displaying social networking information to a member of a social networking service in a sent mail confirmation interface of an e-mail service communicatively linked to the social networking service, the method comprising:

sending by the e-mail service an e-mail from the member to one or more addressees;

determining an e-mail contact address book relationship status for the one or more addressees, the e-mail contact address book relationship status indicating whether the one or more addressees are in a contact address book of the member managed by the e-mail service and if not, determining whether to recommend adding the one or more addressees to the member's address book;

determining a social networking friend relationship status of the one or more addressees to the member by the e-mail service based on user information data accessible via the communicatively linked social networking service; and responsive to completion of sending the e-mail, the e-mail service retrieving from the linked social networking service any social networking events associated with any of the one or more addressees accessible to the member based on the determined social networking friend relationship status, and displaying by the e-mail service the sent mail confirmation interface indicating that the e-mail was sent to the one or more addressees, the sent mail confirmation interface including social networking service friend relationship status information regarding the one or more addressees in combination with one or more social networking events for any of the one or more addressees determined to have friend status with the member in the linked social networking service and for a social networking friend of the member other than the one or more addressees.

8. The one or more computer readable non-volatile storage media of claim 7 wherein the step of displaying by the e-mail service the sent mail confirmation includes ordering the one or more social networking events based upon at least one of the determined relationship statuses to the member.

9. The one or more computer readable non-volatile storage media of claim 7 wherein the method further includes the e-mail service determining and associating an action link of a navigation link based on data accessible via the linked social networking service for each social networking event displayed.

10. The one or more computer readable non-volatile storage media of claim 9 wherein the method further includes the e-mail service determining and associating an action link for adding one or more addressees determined as lacking the e-mail contact address book relationship status to the contact address book of the member.

11. The one or more computer readable non-volatile storage media of claim 10 wherein the method further includes the e-mail service determining and associating an action link providing an invitation to the one or more addressees determined as lacking social networking friend relationship status to join the social networking service as one or more friends of the member.

12. The one or more computer readable non-volatile storage media of claim 7 wherein the e-mail service retrieving from the linked social networking service any social networking events associated with any of the one or more addressees accessible to the member based on the determined social networking friend relationship status further comprises the step of retrieving the one or more social networking events from a plurality of social networking services in which the member and the one or more addressees are related as social networking friends.

13. The one or more computer readable non-volatile storage media of claim 7 wherein the social networking events are prioritized in display in the sent mail confirmation interface so that events for any of the one or more addressees who have been determined to be social networking service friends of the member are shown before one or more social networking events displayed for one or more addressees determined not to be social networking service friends.

14. The one or more computer readable non-volatile storage media of claim 8 wherein the step of displaying by the e-mail service the sent mail confirmation includes ordering the one or more social networking events based upon at least one of the determined relationship statuses to the member further comprises displaying first one or more social networking events regarding the one or more addressees determined not to be in the e-mail contact address book, displaying next one or more social networking events regarding one or more addressees in the e-mail contact address book of the member but who are not social networking friends of the member, and then social networking events regarding social networking service friends.

15. One or more computer readable non-volatile storage media having encoded thereon instructions for causing one or more processors to perform a method for displaying social network information to a member of a social networking service in a confirmation interface of an e-mail service communicatively linked to the social networking service, the method comprising:

receiving by the e-mail service executing on one or more processors input to send an e-mail communication from the member to one or more addressees;

determining a social networking friend relationship status of the one or more addressees to the member by the e-mail service based on user information data accessible via the linked social networking service; and responsive to completion of sending the e-mail, the e-mail service retrieving from the linked social networking service any social networking events associated with any of the one or more addressees accessible to the member based on the determined social networking friend relationship status, and displaying by the email service a sent mail confirmation interface confirming that the e-mail was sent to the one or more addressees, the sent mail confirmation interface including the social networking friend relationship status regarding the one or more addressees in combination with one or more social networking events for any of the one or more addressees determined to have friend status with the member in the linked social networking service and for a social networking friend of the member other than the one or more addressees.

\* \* \* \* \*